United States Patent [19]

Biegen

[11] Patent Number: 5,390,023
[45] Date of Patent: Feb. 14, 1995

[54] INTERFEROMETRIC METHOD AND APPARATUS TO MEASURE SURFACE TOPOGRAPHY

[75] Inventor: James F. Biegen, Middletown, Conn.

[73] Assignee: Zygo Corporation, Middlefield, Conn.

[21] Appl. No.: 127,798

[22] Filed: Sep. 28, 1993

Related U.S. Application Data

[63] Continuation-in-part of Ser. No. 893,324, Jun. 3, 1992, abandoned.

[51] Int. Cl.$^6$ .............................................. G01B 9/02
[52] U.S. Cl. ................................. 356/359; 356/361
[58] Field of Search ........................ 356/359, 360, 361

[56] References Cited

U.S. PATENT DOCUMENTS

| | | | |
|---|---|---|---|
| 4,869,593 | 9/1989 | Biegen | 356/351 |
| 5,133,601 | 7/1992 | Cohen et al. | 356/359 |

*Primary Examiner*—Samuel A. Turner
*Assistant Examiner*—Robert Kim
*Attorney, Agent, or Firm*—Cohen, Pontani, Lieberman, Pavane

[57] ABSTRACT

A non-contact method for measuring the composition-dependent phase change on reflection that occurs using profile measuring interferometry. A profile measuring interference microscope utilizing an extended, narrow bandwidth illumination source is used to generate a two-beam interference intensity pattern at a given field position on a detector array. A reference surface of known surface characteristics and an unknown test surface being profiled are axially translated relative to each other while the interference intensity pattern impinging on the detector array is sampled, digitized, stored and then utilized to produce a digitized two-beam interference intensity pattern, the shape of which is characteristic of the particular interferometer configuration. The axial position of maximum interference contrast and the phase of the digitized two-beam interference intensity pattern at this position of maximum interference contrast are determined by mathematical analysis of the intensity data. The phase at the maximum interference contrast position is divided by an analytically-derived constant to determine the phase change on reflection from the test surface, without regard to the compositional characteristics of the test surface material. The ability to measure and quantify the phase change on reflection for materials with complex indices of refraction notably improves the accuracy of heretofore-known profile measuring interferometric techniques when profiling test surfaces formed of two or more dissimilar materials with at least one having a complex index of refraction.

30 Claims, 4 Drawing Sheets

INTERFEROMETRIC METHOD AND APPARATUS TO MEASURE SURFACE TOPOGRAPHY

CROSS-REFERENCE TO RELATED APPLICATION

This is a continuation-in-part of U.S. patent application Ser. No. 893,324, filed Jun. 3, 1992, now abandoned.

FIELD OF THE INVENTION

The invention relates generally to precision optical metrology instrumentation, specifically to profile measuring interferometers and, more particularly, to increasing the accuracy of profile measuring interference microscopes used in measuring the topography of test surfaces whose index of refraction and hence phase change on reflection may vary significantly as a function of field position.

BACKGROUND OF THE INVENTION

When using profile measuring interference microscopy to measure the phase of a heterogeneous test surface comprised of two or more dissimilar materials, at least one of which has a complex index of refraction, measurement errors result because the amount of phase change on reflection varies with each individual material forming the test surface. Materials with complex indices of refraction produce a phase change on reflection that, in general, varies from material to material as well as from a dielectric's phase change on reflection which is either 0 or $\pi$. For example, conventional profile measuring interferometric techniques cannot distinguish, on the one hand, a phase difference between two points of different height on a test surface and, on the other, a phase difference between two points on a test surface of the same height but composed of dissimilar or composite materials with at least one having a complex index of refraction.

Use of the technique of profile measuring interferometry with an interference microscope to measure the profile of a test surface is known. Such use is described, for example, in Biegen, J. F. and Smythe, R. A., "High-Resolution Profile Measuring Laser Interferometric Microscope for Engineering Surface Metrology", presented at the Fourth International Conference on Metrology and Properties of Engineering Surfaces at the National Bureau of Standards, Washington, D.C., Apr. 13-15, 1988. As applied to interference microscopes, the profile measuring interferometric technique provides effective and accurate test surface profile measurements so long as the test surface is homogeneous, i.e. comprised of a singular material having either a complex or a non-complex index of refraction. The phase change on reflection from a homogeneous test surface is constant as a function of field position and, therefore, does not affect the accuracy of the test surface profile measurement. When, however, the test surface to be profiled is heterogeneous and the phase change on reflection accordingly varies significantly as a function of field position, the phase map produced by profile measuring interferometry no longer represents an accurate geometrical profile of the test surface. In conventional profile measuring interferometry there is no way to extract the phase change on reflection component induced by reflection of the illumination beam off the test surface from the total phase that is measured. This has been a fundamental limitation in the utility and practice of conventional profile measuring interferometry.

Also known is the technique of using values of n and k—the real and imaginary parts of a material's complex index of refraction—previously measured using instrumentation other than profile measuring interferometers, to correct subsequent profile measuring interferometry measurements. This prior art technique, however, has serious limitations. The n and k measurements are usually made on representative materials, rather than on the actual test surface, and even minor differences in material composition between the representative material and the test surface material can introduce large errors in the phase correction. Moreover, when correcting phase measurements carried out with a moderate to high numerical aperture microscope interferometer objective, both the quantities n and k and a measure of the average illumination beam angle of incidence to the test surface are needed. The average illumination beam angle, which is a function of the numerical aperture and of the illumination beam intensity distribution at the entrance pupil of the microscope interferometer objective, can only be found through empirical means with this technique and, as such, introduces a source of potentially significant measurement error in the test surface profile.

Previous techniques for the direct measurement of phase change on reflection, as for example described in J. Bennett, "Precise Method for Measuring the Absolute Phase Change on Reflection", 54 J. Opt. Soc. Am. 612-24 (1964), are difficult, time consuming, limited in use to transparent films and produce results independent of the actual test surface so that even if the measurement results are correct there is no certainty that the result actually represents the material on the test surface.

A method of directly measuring the phase change on reflection is discussed in "Measurement of Transducers on Thin Film Sliders for Rigid Disk Drives", presented at the International Disk Conference in Tokyo, Japan, April, 1992. That article describes a time consuming, two-step process which consists of first measuring the test surface with a profile measuring interference microscope, overcoating the test surface with a homogeneous opaque material, and then remeasuring the test surface again with a profile measuring interference microscope. The two profiles thus obtained are subtracted one from the other, the difference between the profiles being the phase change on reflection.

Other profile measuring interference microscope techniques that determine the axial position of maximum fringe contrast for profiling the test surface emphasize the use of broad spectral bandwidth (i.e. white light) as the preferred illumination. See U.S. Pat. No. 4,340,306 to Balasubramanian; M. Davidson et al., "An Application of Interference Microscopy to Integrated Circuit Inspection and Metrology", 775 SPIE 233-247 (1987); G. S. Kino and S. T. Chim, "Mirau Correlation Microscope", 29 Applied Optics 3775-83 (1990); and B. S. Lee and T. C. Strand, "Profilometry With a Coherence Scanning Microscope", 29 Applied Optics 3784-88 (1990). A broad illumination spectral bandwidth reduces crosstalk between vertically adjacent features, permitting depth slicing as in confocal scanning microscopy. A broad bandwidth also allows for a theoretically unlimited test surface feature measurement range with high vertical resolution. And with a large illumination spectral bandwidth, the axial interference region is small and independent of the objective magnification or numerical aperture so that vertical resolution is constant across the magnification range and is not a function of the objective depth of focus, as it is in confocal scanning microscopy. One disadvantage of broad illumination spectral bandwidth is that the axial position of maximum interference contrast will shift in axial position as a function of the material properties of the test surface. The phase of the interference at this axial position cannot be related to the phase change on reflection without a priori information on the material properties of the test surface. This renders the technique as inaccurate as conventional profile measuring interferometry when measuring heterogeneous test surfaces comprised of two or more dissimilar materials with at least one having a complex index of refraction.

In contrast, the herein disclosed method and apparatus of the invention extend and improve the technique of conventional profile measuring interference microscopy by additionally measuring the phase change on reflection from the surface of metals, semi-metals, and dielectrics being profiled, and thereby correct a systematic measurement error that occurs when utilizing conventional profile measuring interference microscopy.

OBJECTS OF THE INVENTION

Accordingly, it is a principal object of the present invention to increase the accuracy of profile measuring interference microscopy for use with a test surface comprised of two or more disimilar or composite materials, at least one of which has a complex index of refraction.

It is a particular object of the invention to accurately profile a test surface comprised of disimilar or composite materials with complex indices of refraction.

It is another object of the invention to measure the phase change on reflection from a test surface comprised of disimilar or composite materials with complex indices of refraction.

A further object of the invention is to use previously measured phase change on reflection values to correct any subsequent profile measurements of test surfaces in any application of profile measuring interferometry.

SUMMARY OF THE INVENTION

Briefly described, the present invention provides an apparatus and technique for measuring the profile and phase change on reflection from test surfaces of materials whose index of refraction is complex. The apparatus comprises a profile measuring interference microscope having an extended, narrow bandwidth illumination source. The microscope interferometer objective is equal path, with a moderate to high numerical aperture. A solid-state camera array having multiple detector pixel sites is located in an image plane of the interference microscope. On the photo-receptive surface of the camera array, in the image plane, the test and reference surfaces are imaged together with the two-beam interference intensity pattern which represents the optical path difference, or phase difference, between the test and reference surface wavefronts. For an equal path two-beam interferometer having an extended, narrow bandwidth illumination source, the interference intensity varies as the geometrical path difference between the test surface and the reference surface is varied axially along the so-called z-axis, generally an imaging axis of the microscope. The resultant intensity function has the form of a cosine wave whose amplitude is modulated by a slowly varying function known as the modulus of the complex degree of coherence, or coherence modulus. The axial extent of the coherence modulus is a function of the diameter of the illumination source and its spectral bandwidth, of the numerical aperture of the microscope interferometer objective, and of the wavelength of the illumination beam.

In operation, during an initial macro focusing procedure, the test surface is moved or translated axially along the z-axis, inside focus, until the relative separation between the test and reference surfaces is greater than the axial extent of the coherence modulus, i.e. to a position at which the interference contrast is essentially zero. Then, by means of a piezoelectric transducer (PZT) crystal or other motion transducer, the test surface is linearly translated axially at a constant velocity, or stepped in constant increments, along the z-axis in the direction of increasing interference contrast so as to vary the geometrical path separation between the unknown test surface and the known reference surface until the interference intensity values along the entire axial extent of the coherence modulus have been scanned. For a moderate to high numerical aperture microscope interferometer objective, the coherence modulus axial extent is on the order of a few micrometers. The scanned intensity values received at the detector array are converted to electrical signals, sampled at a predetermined sampling frequency, digitized, and stored sequentially in a computer or processor memory. The stored intensity values obtained at any given pixel site of the detector array represent the two-beam interference intensity pattern of the particular interferometer configuration as a function of the geometrical path separation between the test and reference surfaces at a specific x and y coordinate of the test surface.

For an extended, narrow bandwidth illumination source, the axial position of the coherence modulus center—i.e. the position of maximum interference contrast -- is shifted from the position where the geometrical path difference between the test and reference surfaces is zero by an amount that is proportional to the product of the mean wavelength of the illumination source and the composition-dependent phase change on reflection. The composition-dependent phase change on reflection from the non-dielectric test surface also produces a phase shift of the two-beam interference intensity pattern relative to the axial position where the geometrical path difference between the test and reference surfaces is zero. The center position of the coherence modulus and the phase of the two-beam interference intensity pattern at the position of the center of the coherence modulus are determined from the digitized intensity data stored in computer memory for both a dielectric and a non-dielectric test surface. The phase change on reflection from the non-dielectric test surface can then be obtained by subtracting the phase of the two-beam interference intensity pattern determined at the position of the center of the coherence modulus for the non-dielectric test surface from the phase of the two-beam interference intensity pattern determined at the position of the center of the coherence modulus for the dielectric test surface and dividing this quantity by an analytically derived constant that is independent of material.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE DRAWINGS

In the drawings, wherein like reference characters denote similar elements throughout the several views.

Figure 3:
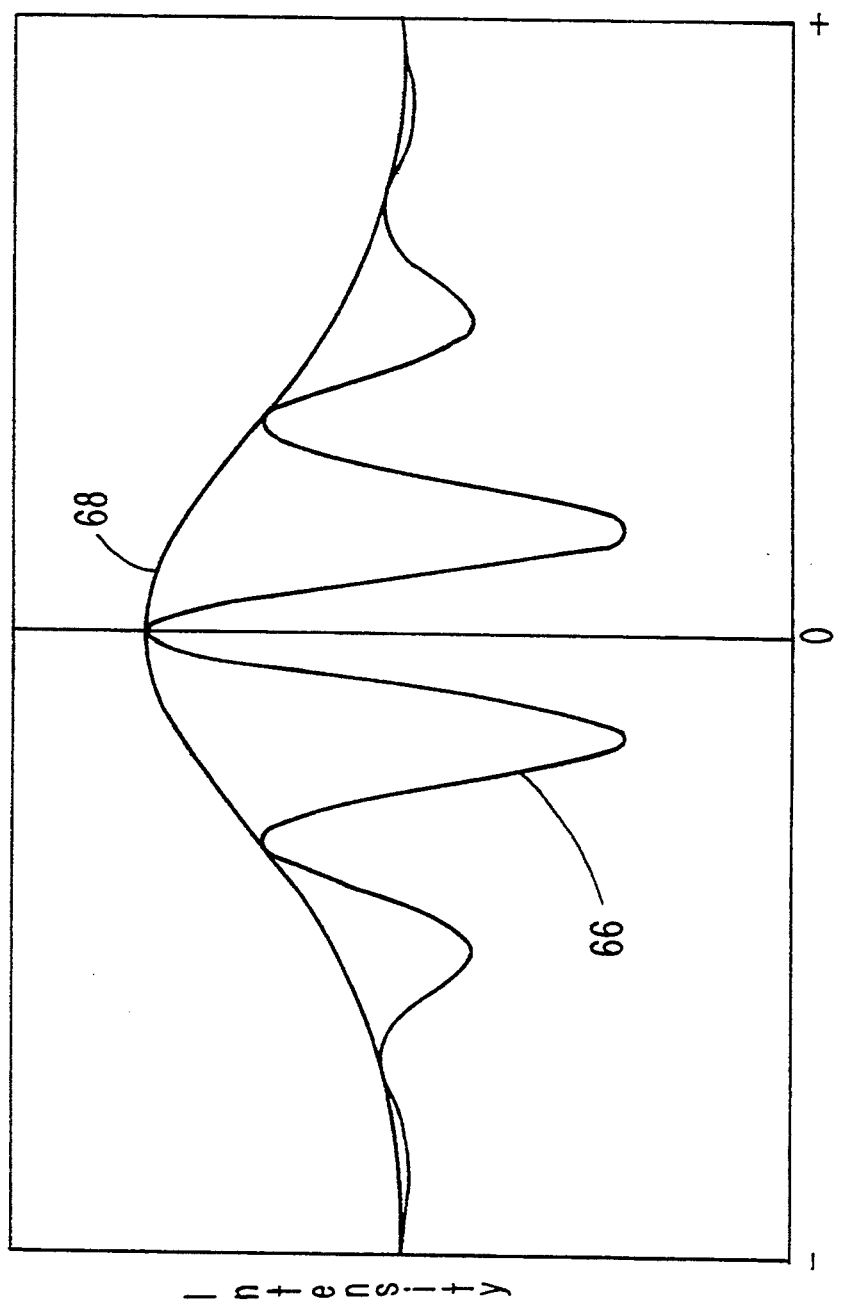
Figure 4:
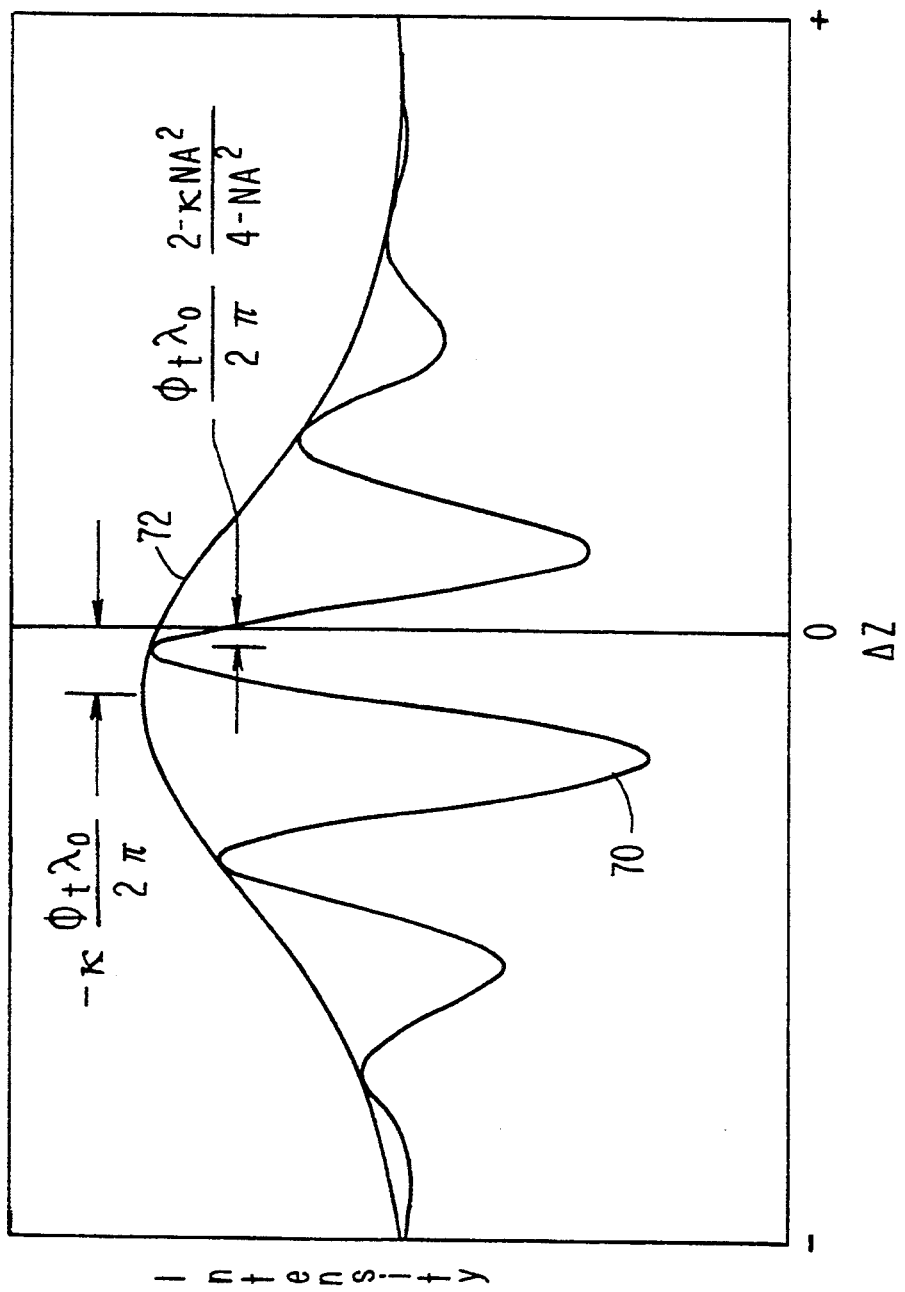

FIG. 3 is a graph showing a two-beam interference intensity pattern as a function of axial separation between a dielectric test surface and a dielectric reference surface using an extended, narrow bandwidth illumination source in accordance with the present invention; and FIG. 4 is a graph showing a two-beam interference intensity pattern as a function of axial separation between a non-dielectric test surface and a reference surface using an extended, narrow bandwidth illumination source in accordance with the invention.

DETAILED DESCRIPTION OF THE PREFERRED EMBODIMENTS

Figure 1:
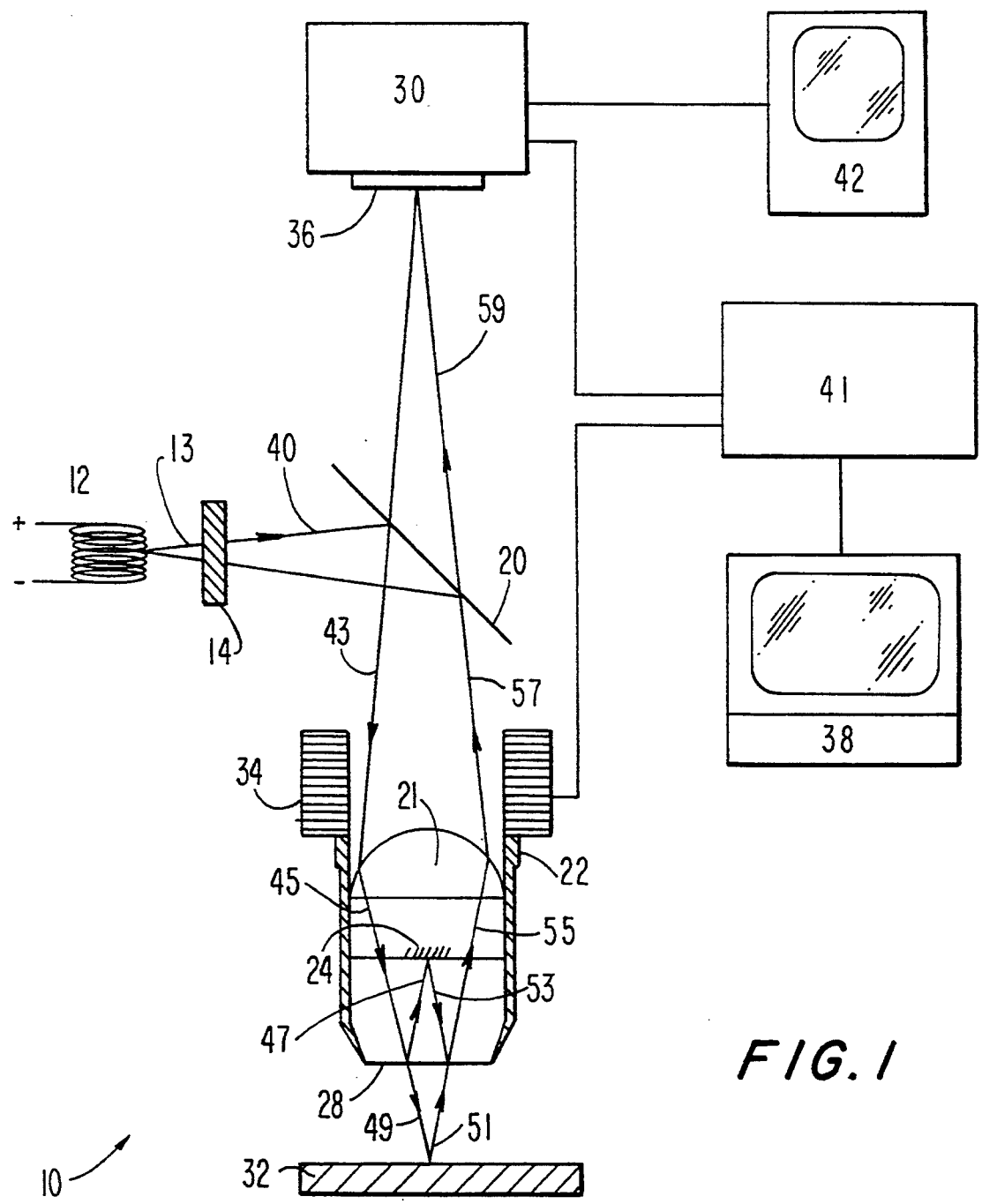
FIG. 1 is a diagrammatic depiction of the basic functional components of a profile measuring interference microscope apparatus constructed in accordance with the present invention and including an extended, narrow bandwidth illumination source.

Referring first to FIG. 1, reference numeral 10 designates an embodiment of a profile measuring interference microscope apparatus constructed in accordance with the present invention. An incandescent, broad bandwidth illumination source 12 emits an illumination beam 13 of spectral bandwidth $\Delta\lambda$ that is passed through a narrow bandwidth filter 14 to produce a narrow bandwidth illumination beam 40 of mean wavelength $\lambda_0$, such that $\Delta\lambda/\lambda_0 < < 1$, and having the spatial properties of the source 12. Illumination beam 40 is reflected toward the microscope interferometer objective 22 by a beam splitter 20 to define a reflected illumination beam 43. The objective 22 is of the equal path type with a moderate to high numerical aperture (NA). The reflected illumination beam 43 from the beamsplitter 20 is refracted by the objective lens 21 to form the refracted illumination beam 45.

The refracted illumination beam 45 from the objective lens 21 impinges a beamsplitter surface 28 that is carried by the objective 22 in fixed positional relation to the lens 21. The beamsplitter surface 28 reflects a portion of the refracted beam and transmits a portion of the refracted beam to thereby split the beam 45 into a partially reflected illumination beam 47 and a partially transmitted illumination beam 49, respectively. The reflected beam 47 impinges on a reference surface 24 of known topography and material characteristics that is carried by the microscope objective 22 intermediately between, in the apparatus 10 herein disclosed, and in fixed positional relation to the lens 21 and beamsplitter surface 28; the resulting reflection of the reflected beam 47 from the reference surface 24 defines the reference surface imaging beam 53 which is directed back to the beamsplitter surface 28. The transmitted beam 49 from the beamsplitter surface 28 is similarly directed into reflective incidence with a test surface 32 of unknown topography and/or material characteristics and the resulting test surface imaging beam 51 reflected from a portion of the test surface impinges on the beamsplitter surface 28 coincident with the reference surface imaging beam 53 to thereby combine the test and reference surface imaging beams and form a reflected imaging beam 55. Thus, the test surface imaging beam 51 is formed by reflection of the image of the extended source 12 from that portion of the test surface 32 to be profiled, and the reference surface imaging beam 53 is formed by reflection of the extended image source from the reference surface 24. The reflected imaging beam 55, representing the interference between the two beams reflected from the test and reference surfaces, is directed from the beamsplitter surface 28 towards the objective lens 21 by which the beam 55 is refracted to form the refracted imaging beam 57. The refracted beam 57 passes through the beamsplitter 20, emerging as the transmitted imaging beam 59 which impinges on a detector array 30 to form the simultaneous image of the extended, narrow bandwidth source 12, of the reference surface 24 and test surface 32, and of the two-beam interference waveform resulting from the combination of the wavefronts reflected from the test and reference surfaces. The detector array 30 may, by way of example, be implemented by a CCD or like solid state camera or detector located in an image plane of the interference microscope. The array 30 thus receives, and converts into an electrical signal, a two-beam interference intensity value which represents the relationship between the interference intensity pattern and the geometrical path difference between the reference surface 24 and test surface 32.

A piezoelectric transducer 34, in response to an electrical signal from an electronic or otherwise implemented controller 41, drives the microscope interferometer objective 22—which carries in relatively fixed positional relation the objective lens 21, the reference surface 24 and the beamsplitter surface 28—through an axial translation linearly toward and/or away from the test surface 32, thereby varying the geometrical path difference between the test surface 32 and the reference surface 24 and, correspondingly, producing a two-beam interference intensity pattern formed at the imaging or interference plane 36 of the detector array 30. The axial translation of the microscope objective 22 is preferably at a constant linear rate. Of course, embodiments in which the test surface 32 is axially translated, in lieu of the microscope objective 22, are also within the intended scope of the invention. The analog electrical signal generated by the detector array 30 is sampled and digitized by the controller 40 and sent to a processor or computer 38 for data storage and subsequent analysis, the results of which are displayed on a monitor of the computer 38. The sampling rate should be sufficiently high as to enable suitable reconstruction of the interference intensity pattern; typically, at least two samples per fringe should be collected, although it will be readily recognized that the more samples collected per fringe, the more accurate the achievable reconstruction of the intensity pattern. The intensity pattern at the detector array image/interference plane may also be displayed directly on an image monitor 42.

The test surface 32 is preferably positioned relative to the objective 22, during initial focusing, so as to be located just outside of the axial region of interference before the piezoelectric transducer 34 receives an electrical signal from the controller 40 for linearly translating the objective 22. In response to that electrical signal, the piezoelectric transducer 34 expands, and thereby effects movement of the microscope interferometer objective 22 toward the test surface 32. This movement results in a corresponding change or variation in the geometrical path difference as between the test surface 32 and the reference surface 24, which in turn produces a varying interference intensity pattern such, for example, as those depicted in FIGS. 3 and 4.

Before describing the use and analysis of the interference intensity pattern data received, sampled and stored in accordance with the invention, it should be pointed out that it is intended, and generally contemplated, that the foregoing procedure for generating the interference intensity pattern be repeated for a plurality of surface locations or areas or portions of the test surface. This will normally be done by predeterminately sampling the detector array 30 at different positions or locations along the "x,y" coordinate axes—i.e. generally perpendicular to the direction of z-axis relative axial movement or translation between the test and reference surfaces—so as to sample another location at which the transmitted beam 49 from the beamsplitter surface 28 reflectingly impinges on the test surface. By repeatedly sampling the detector array 30 along the "x,y" coordinate axes in this manner, the entire test surface portion of interest can be topographically mapped and the material characteristics of that portion may be determined in accordance with the invention.

Figure 2:
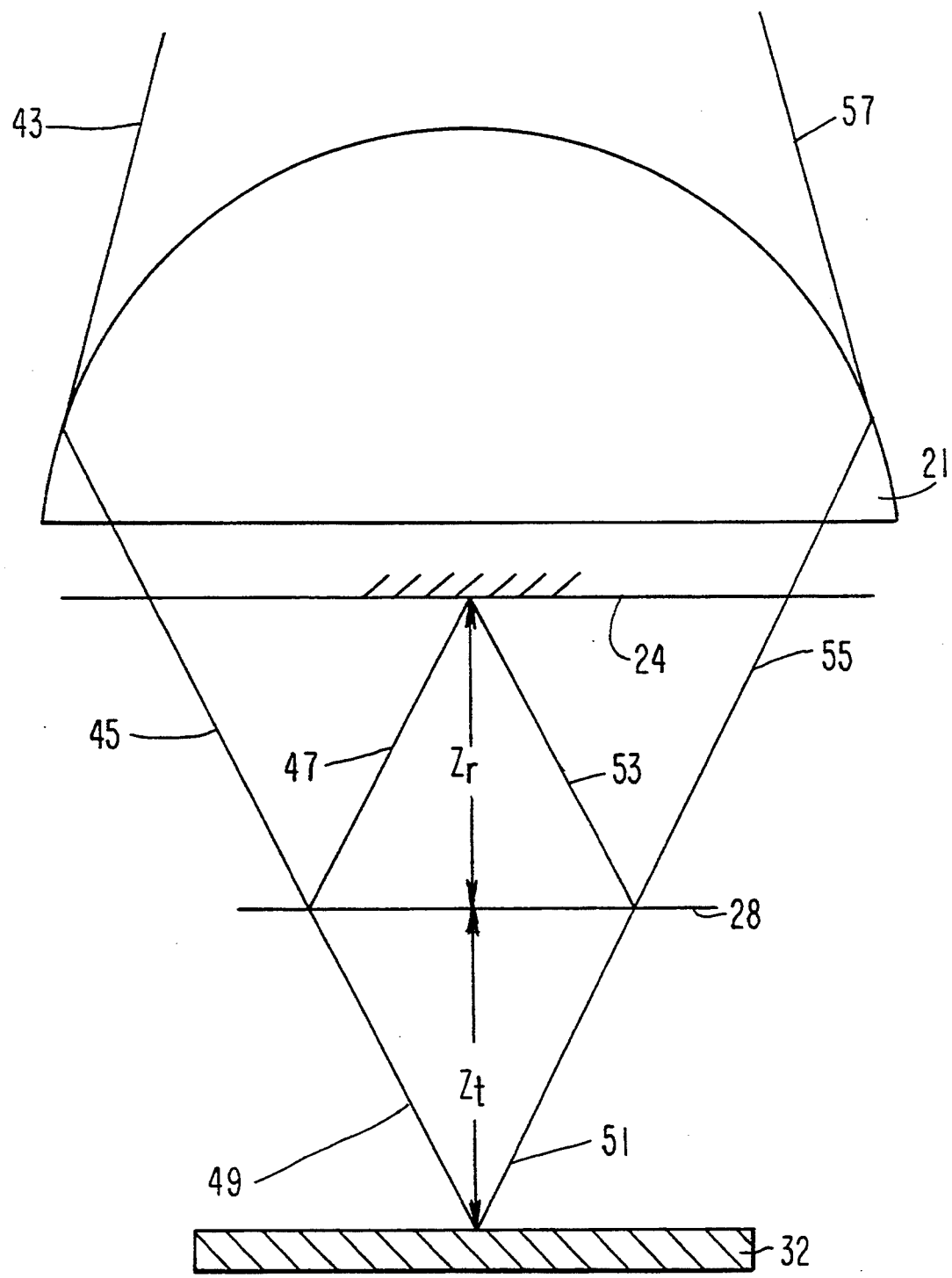
FIG. 2 is an enlarged representation of portions of the interferometer objective of the apparatus of FIG. 1, showing the relation between the reference and test surfaces.

Referring now to FIG. 2, the total phase measured, $\Phi_{total}(x, y)$, by a profile measuring interference microscope such as that herein described and shown in FIG. 1 is the difference between the test surface phase $\Phi_t(x, y)$ and the reference surface phase $\Phi_r(x, y)$, plus the term $4\pi[z_t(x,y)-z_r(x,y)]/\lambda_0$ which represents the geometrical phase difference produced as a result of the relative separation between the test surface 32 and the reference surface 24. $\lambda_0$ is the mean wavelength of the illumination beam, and is selected so as to accommodate the intended sensitivity of the measurements to be attained in use. The term $z_t(x,y)$ is the test surface geometrical path length from the beamsplitter 28 to the test surface 32 and is proportional to the actual test surface profile $H(x,y)$. The term $z_r(x,y)$ is the reference surface geometrical path length from the beamsplitter 28 to the reference surface 24. In actual practice $z_r(x,y)$, the reference surface geometrical path length, and $\Phi_r(x,y)$, the reference surface phase change on reflection, are both assumed to be constant and independent of the x, y coordinate location of the portion of the test surface being profiled, commonly referred to as the field position. Thus, $\Phi_r(x,y)=\Phi_r$ and $z_r(x,y)=z_r$ and, accordingly, the total phase measured at the detector array 30 may be represented as:

$$\Phi_{total}(x,y)=4\pi[z_t(x,y)-z_r]/\lambda_0+\Phi_t(x,y)-\Phi_r \qquad \text{Eq. 2}$$

Neglecting the constant and linear offset terms introduced by the phase difference term $4\pi[z_t(x,y)-z_r]/\lambda_0$, and the reference surface phase change on reflection term $\Phi_r$, the relationship of the total phase measured, $\Phi_{total}(x,y)$, to the actual test surface profile may be written as:

$$H(x,y)=\lambda_0[\Phi_{total}(x,y)-\Phi_t(x,y)]/4\pi \qquad \text{Eq. 2}$$

In order for the test surface phase change on reflection term $\Phi_t(x,y)$ to have no effect on the accuracy of the actual test surface profile measurement $H(x,y)$, the term $\Phi_t(x,y)$ must either (1) be previously known, so that it can be subtracted out, or (2) be a constant, independent of field position. Only when at least one of these conditions are met will Eq. 2 provide accurate results.

Prior art profile measuring interference microscopes determine only the total phase measured, $\Phi_{total}(x,y)$, and neglect the test surface phase change on reflection contribution $\Phi_t(x,y)$ because of the difficulty in obtaining accurate, readily achieved measurements of $\Phi_t(x,y)$. The consequence is that a significant source of error in determining $H(x,y)$ is ignored. The method and apparatus of the present invention, on the other hand, can advantageously determine both the total phase measured, $\Phi_{total}(X,Y)$, and the test surface phase change on reflection, $\Phi_t(x,y)$, and accordingly represents a considerable improvement over prior art procedures and apparatus for profile measuring interference microscopy.

The following mathematical expressions have been simplified from those discussed hereinabove to exclude any explicit field (x, y) dependence. Although lacking such explicit field dependence, they are not intended to suggest that none exists. The inventive method herein described, however, is applicable at all points in the field (x, y) of the test surface.

The equation for two-beam interference with narrow bandwidth illumination for any singular point in the test surface field is $$I(\Delta z)=I_t+I_r+2\sqrt{(I_tI_r)}Re[Y_{tr}(\Delta z)] \qquad \text{Eq. 3}$$

where $I_t$ is the test beam intensity, $I_r$ is the reference beam intensity, and $\Delta z=z_t-z_r$. The symbol $Re[]$ refers to the real part of the expression contained within the brackets and $Y_{tr}(\Delta z)$ is the complex degree of coherence, whose modulus satisfies the relation $0 \leq |Y_{tr}(\Delta z)| \leq 1$. Where the illumination source is narrow bandwidth and extended, the function representing the complex degree of coherence $Y_{tr}(\Delta z)$ is given by $$\gamma_{tr}(\Delta z) = \frac{\int_\sigma\int I_s(\xi,\eta) e^{i\frac{2\pi}{\lambda_0}[R_t-R_r]}d\xi d\eta}{\int_\sigma\int I_s(\xi,\eta)d\xi d\eta} \qquad \text{Eq. 4}$$

where $I_s(\xi\eta)$ is the intensity distribution at the entrance pupil of the microscope interferometer objective 22 with spatial coordinates $\xi$ and $\eta$. $R_t$ and $R_r$ are the optical path lengths from a point at the entrance pupil along the corresponding test and reference beam paths to the image/interference plane 36. Changing to cylindrical coordinates and making the assumptions of an intensity distribution at the circular entrance pupil of the microscope interferometer objective 22 that is uniform and that there is no significant lateral or radial shear between the test and reference beams, the integral in Eq. 4 can be rewritten as $$\gamma_{tr}(\Delta z) = \frac{e^{i(-\frac{4\pi}{\lambda_0}\Delta z)}\int_0^1\int_0^{2\pi} e^{-i[\frac{1}{2}up^2-\Phi_t(\rho)]}\rho d\rho d\Theta}{\int_0^1\int_0^{2\pi}\rho d\rho d\Theta} \qquad \text{Eq. 5}$$

where the term u is equal to $4\pi NA^2\Delta z/\lambda_0$. NA is the effective numerical aperture of the microscope interferometer objective 22 and takes into account any vignetting or central obscurations in the beam path. The term $\Phi_t(\rho)$ is equal to $(1-\kappa NA^2 \rho^2)\Phi_t$ and represents a parabolic approximation to the exact equation, which is well known in the art and is far more complex, relating the phase change on reflection to the illumination angle of incidence at the test surface 32 for a given material's complex index of refraction. (See Born & Wolf, *Principles of Optics*, Sixth (Corrected) Edition, Equations (6) and (13) at page 629; pages 628–629 of that text are expressly incorporated by reference herein.) The constant $\kappa$ in the approximation $(1-\kappa NA^2\kappa^2)\Phi_t$ is obtained using a least squares minimization curve-fitting algorithm to fit $\Phi 40_t(\rho)=(1-\kappa NA^2\rho^2)$—the above equation normalized to $\Phi$—to data generated using the exact equation that has itself been normalized to its zero angle of incidence phase change on reflection value. For any given material's complex index of refraction used in that exact equation, the shape of the resulting curve is substantially independent of material. The value of $\kappa$ found from curve fitting the normalized approximation to the thereby generated data is unaffected by any potential value of $\Phi_t$ in the approximation $(1-\kappa NA^2\rho^2)\Phi_t$, but is affected slightly by the value chosen for the numerical aperture of the microscope interferometer objective 22.

The integral in Eq. 5 can be evaluated to define the real part of the complex degree of coherence function as $$Re[\gamma_{tr}(\Delta z)] = \cos\left[\frac{4\pi}{\lambda_0}\left(1-\frac{NA^2}{4}\right)\Delta z + \left(1-\frac{\kappa}{2}NA^2\right)\phi_t\right]\text{sinc}\left[\frac{\pi}{\lambda_0}NA^2\Delta z + \frac{\kappa}{2}NA^2\phi_t\right] \quad \text{Eq. 6}$$

Substituting Eq. 6 into Eq. 3 yields the specific equation for two-beam interference with an illumination source that is uniform, extended, and narrow bandwidth and for a test surface that has a wavelength and illumination angle-dependent phase change on reflection:

$$I = I_t + I_r + 2\sqrt{I_tI_r}\cos\left[\frac{4\pi}{\lambda_0}\left(1-\frac{NA^2}{4}\right)\Delta z + \left(1-\frac{\kappa}{2}NA^2\right)\phi_t\right]\text{sinc}\left[\frac{\pi}{\lambda_0}NA^2\Delta z + \frac{\kappa}{2}NA^2\phi_t\right] \quad \text{Eq. 7}$$

FIG. 3 is a plot, prepared using Eq. 7, of the two-beam axial interference intensity 66 as a function of $\Delta z$ when the test surface 32 and reference surface 24 are formed of a dielectric material—i.e. when $\Phi_t$ is equal to 0 or $7\pi$. Both the interference intensity pattern 66 and the coherence modulus function 68 are centered at the axial position of zero geometrical path difference (i.e. $z=0$) between the test surface 32 and the reference surface 24.

FIG. 4 shows the same plot where the test surface 32 is formed of a non-dielectric material and, therefore, exhibits a phase change on reflection of $\Phi_t$. It will be seen that the coherence modulus function 72 is shifted relative to the axial position of zero geometrical path difference by $-\kappa\Phi_t\lambda_0 2\pi$, and the interference intensity pattern 70 is also shifted in phase relative to the axial position of zero geometrical path difference by $\{1-(\kappa NA^2/2)\}\Phi^t$. This results from the use of an extended, narrow bandwidth illumination source and enables, in accordance with the present invention, ready measurement of the phase change that is due solely to reflection from the test surface itself.

As can be seen from Eq. 7, the axial extent of the coherence modulus 72 depicted in FIG. 4 is a function of the effective numerical aperture NA of the microscope interferometer objective 22. Thus, the larger the numerical aperture NA of the interferometer objective 22, the smaller the axial extent of the sinc coherence modulus 72. At $\Delta z = -\Phi_t\lambda_0/2\pi$—i.e. the axial position of the center of the coherence modulus—Eq. 7 reduces to $$I=I_t+I_r+2\sqrt{I_tI_r}\cos\left[(1-2\kappa)\Phi_t\right] \quad \text{Eq. 8}$$

yielding an equation from which the test surface phase change on reflection, $\Phi_t$, can be obtained uniquely at any point in the test surface field (x, y) since $\kappa$ can be analytically derived and known a priori.

The two-beam interference intensity pattern detected by the detector array 30 and digitized and stored in the computer 38 can be analyzed by any number of methods to provide $\Phi_t$, the test surface phase change on reflection, at any given point in the test surface field (x, y). In a preferred embodiment of the invention a least squares minimization curve-fitting algorithm is employed to fit the following equation to the stored two-beam interference intensity data $$I_i=k_0+k_1\cos[k_2i+k_3]\text{sinc}[k_4i+k_5] \quad \text{Eq. 9}$$

and to thereby evaluate the parameters $k_2$, $k_3$, $k_4$, and $k_5$. Eq. 9, in which i denotes the sequential position of a given data point within the two-beam interference intensity data, is identical to Eq. 7 except that the constants in Eq. 7 have been combined where possible into one constant. The phase at the center of the coherence modulus is then $-k_2(k_5/k_4)+k_3$. Since the reference surface 25 is nearly always coated with a non-dielectric, two interference intensity measurements are needed to find the composition-dependent phase change on reflection from the test surface 32. One measurement is made on a dielectric test surface and the other on the test surface of interest. The phase at the center of each of the two coherence moduli is first found for both measurements by curve-fitting Eq. 9 to the two respective interference intensity data sets. The two phases are then subtracted one from the other, and the result is divided by $(1-2\kappa)$ to obtain the composition-dependent phase change on reflection $\Phi_t$ of the test surface 32. The value $\Phi_t$ thereby obtained is then subtracted from the total measured phase $\Phi_{total}$, yielding a test surface profile measurement of significantly enhanced accuracy than heretofore attainable.

In an alternate embodiment of the inventive method, a coherence modulus is calculated using the stored two-beam interference intensity data and the following equation:

$$M_i = \left[\frac{I_{i-2n}+I_{i+2n}}{2} - I_i\right]^2 + [I_{i-n} - I_{i+n}]^2 \quad \text{Eq. 10}$$

where i is, as before, the sequential position of a given data point within the two-beam interference intensity data set and n is one-fourth the number of data points taken per interference fringe. The data outside the minima of the central lobe of the coherence modulus thereby calculated are discarded, and a least squares minimization curve-fitting algorithm is used to fit the following parabolic equation to the the stored two-beam interference intensity data:

$$M'_i = C_o + C_1 i + C_2 i^2 \qquad \text{Eq. 11}$$

to find the parameters $c_1$ and $c_2$. The peak value of the calculated coherence modulus $M_i$ is found where $M'_i$ is equal to $-c_1(2c_2)$. This axial position is taken for the center of the calculated coherence modulus. The axial position of the center of the peak fringe of the two-beam interference intensity data nearest the center of the calculated coherence modulus is next determined by first locating the peak intensity value nearest the calculated coherence modulus. A second parabolic equation is then curve-fitted to a selected number of intensity data points on either side of and including the peak intensity value to find a second set of parameters $c'_1$ and $c'_2$. The value of $-c'_1/(2c'_2)$ is the axial position at which the peak fringe nearest the center of the calculated coherence modulus is a maximum. The difference between the axial position where the calculated coherence modulus is a maximum and the axial position where the peak fringe nearest the center of the coherence modulus is a maximum is then calculated. This procedure is repeated twice, once for a dielectric test surface and once for the test surface of interest. The two results are subtracted, one from the other, and this difference is divided by $(1-2\kappa)$ to obtain the composition-dependent phase change on reflection $\Phi_t$ of the test surface 32. The value $\Phi_t$ thereby obtained is then subtracted from the total measured phase $\Phi_{total}$, yielding a test surface profile measurement of significantly enhanced accuracy than heretofore attainable.

The present invention may be broadly described as a non-contact method of determining a phase change on reflection from a test surface of unknown topography and composition, wherein the method includes the steps of producing a first illumination beam and a second illumination beam from an extended, narrow bandwidth source; establishing on a detector an interference beam having an intensity which results from the interference between a first wavefront and a second wavefront, the first wavefront being formed by reflection of the first illumination beam from at least one point on a reference surface of known topography and composition and the second wavefront being formed by reflection of the second illumination beam from a corresponding point on a test surface of unknown topography and composition; moving one of the reference surface and the test surface relative to the other said surface over a predetermined linear range of motion so as to translate one of the first and second wavefronts relative to the other said wavefront and thereby vary the interference beam intensity and create an interference intensity pattern on the detector; identifying a point of maximum interference contrast of the interference intensity pattern on the detector at a position along the predetermined linear range of motion; and determining a phase shift introduced by said reflection of the second illumination beam from the test surface by analyzing the interference intensity pattern at the point of maximum interference contrast to thereby determine the composition-dependent phase change on reflection from the test surface.

While there have been shown and described and pointed out fundamental novel features of the invention as applied to preferred embodiments thereof, it will be understood that various omissions and substitutions and changes in the form and details of the disclosed methods and apparatus may be made by those skilled in the art without departing from the spirit of the invention. It is the intention, therefore, to be limited only as indicated by the scope of the claims appended hereto.

What is claimed is:

1. In a non-contact method of profiling a test surface of unknown topography and composition, a method of determining a composition-dependent phase change on reflection introduced by reflection of an illumination beam from the test surface, comprising the steps of:

(a) producing a first illumination beam and a second illumination beam from an extended, narrow bandwidth source;

(b) establishing on a detector an imaging beam having an intensity which results from the interference between a first wavefront and a second wavefront, the first wavefront being formed by reflection of the first illumination beam from at least one point on a reference surface of known topography and composition and the second wavefront being formed by reflection of the second illumination beam from a corresponding point on a test surface of unknown topography and composition;

(c) moving one of the reference surface and the test surface relative to the other said surface over a predetermined linear range of motion so as to translate one of the first and second wavefronts relative to the other said wavefront and thereby vary the imaging beam intensity and create a time-varying interference intensity pattern on the detector;

(d) calculating the phase of said interference intensity pattern at a point of maximum interference contrast of the interference intensity pattern on the detector to provide a value proportional to the composition-dependent phase change on reflection introduced by said reflection of the second illumination beam from said test surface;

(e) calculating a constant $\kappa$ by curve-fitting the relationship $(1-\kappa NA^2\rho^2)$, where $\rho$ is a constant that varies from 0 to 1 and NA is an effective numerical aperture of an interferometer objective through which the extended, narrow bandwidth source is passed, to ideal data calculated using an equation defining a function $\Phi(\theta)$ which relates phase change on reflection from a surface to an angle $\theta$ of illumination incidence on the surface and which has been normalized to a zero angle of illumination incidence; and (f) dividing said value by $1-2\kappa$ to provide said phase change on reflection introduced by said reflection of the second illumination beam from said test surface.

2. In a method in accordance with claim 1, wherein said time-varying interference intensity pattern comprises a set of sequential data points I, and wherein said step (d) comprises evaluating constants $k_2$, $k_3$, $k_4$ and $k_5$ by curve-fitting said time-varying interference intensity pattern to $$I_i = k_0 k_1 \cos[k_2 i + k_3] \operatorname{sinc}[k_4 i + k_5]$$

where i denotes a sequential position of each data point in the set of data points and $k_0$ and $k_1$ are constants, and calculating said value V from $V = -k_2(k_5/k_4) + k_3$.

3. In a method in accordance with claim 2, wherein said step (d) further comprises the steps of:

(i) establishing on the detector an imaging beam having an intensity which results from interference between a first wavefront and a second wavefront, the first wavefront being formed by reflection of the first illumination beam from at least one point on the reference surface and the second wavefront being formed by reflection of the second illumination beam from a corresponding point on a calibration test surface, said calibration test surface comprising a dielectric surface of known topography and composition;

(ii) moving one of the reference surface and the calibration test surface relative to the other said surface over a predetermined linear range of motion so as to translate one of the first and second wavefronts relative to the other said wavefront and thereby vary the imaging beam intensity and create a time-varying interference intensity calibration pattern on the detector;

(iii) calculating the phase of said interference intensity calibration pattern at a point of maximum interference contrast of the interference intensity pattern on the detector to provide a calibration value proportional to a composition-dependent phase shift introduced by said reflection of the second illumination beam from said calibration test surface; and (iv) subtracting said calibration value from said value V to define a corrected value proportional to the composition-dependent phase change on reflection introduced by said reflection of the second illumination beam from said test surface.

4. In a method in accordance with claim 3, wherein said time-varying interference intensity calibration pattern comprises a set of sequential data points C, and wherein said step (d)(iii) comprises evaluating constants $k'_2$, $k'_3$, $k'_4$ and $k'_5$ by curve-fitting said time-varying interference intensity calibration pattern to $$C_i k'_0 + k'_1 \cos [k'_2 i + k'_3] \operatorname{sinc}[k'_4 i + k'_5]$$

where i denotes a sequential position of each data point in the set of data point of said time-varying intensity calibration pattern and $k'_0$ and $k'_1$, and calculating said calibration value $V_c$ from $V_c = -k'_2(k'_5/k'_4) + k'_3$.

5. In a method in accordance with claim 4, wherein said step (f) further comprises calculating said corrected value from $-k_2(k_5/k_4) + k_3$.

6. In a method in accordance with claim 1 wherein said reference surface comprises a non-dielectric material, said step (d) further comprising:

(i) establishing on the detector an imaging beam having an intensity which results from interference between a first wavefront and a second wavefront, the first wavefront being formed by reflection of the first illumination beam from at least one point on the reference surface and the second wavefront being formed by reflection of the second illumination beam from a corresponding point on a calibration test surface, said calibration test surface comprising a dielectric surface of known topography and composition;

(ii) moving one of the reference surface and the calibration test surface relative to the other said surface over a predetermined linear range of motion so as to translate one of the first and second wavefronts relative to the other said wavefront and thereby vary the imaging beam intensity and create a time-varying interference intensity calibration pattern on the detector;

(iii) calculating the phase of said interference intensity calibration pattern at a point of maximum interference contrast of the interference intensity pattern on the detector to provide a calibration value proportional to a composition-dependent phase shift introduced by said reflection of the second illumination beam from said calibration test surface; and (iv) subtracting said calibration value from said value to define a corrected value proportional to the composition-dependent phase change on reflection introduced by said reflection of the second illumination beam from said test surface.

7. A method of profiling surface characteristics of a test surface of unknown topography using a phase shifting interferometric microscope, comprising the steps of:

(a) directing a beam of extended, narrow bandwidth illumination to a beamsplitter in which the narrow bandwidth illumination beam is split to form a reflected illumination beam and a transmitted illumination beam;

(b) reflecting the reflected illumination beam off a reference surface having known surface characteristics and mounted in fixed relation to the beamsplitter to form a reflected reference surface image beam;

(c) reflecting the transmitted illumination beam off a portion of a test surface located in predetermined relation to the beamsplitter to form a reflected test surface image beam;

(d) combining the reflected reference surface image beam and the reflected test surface image beam to form a reflected imaging beam having an interference intensity, said reflected imaging beam interference intensity being a function of material characteristics of the test surface portion and of a first distance between the test surface portion and the beamsplitter;

(e) moving the beamsplitter and the reference surface concomitantly over a predetermined linear range of motion so as to vary said first distance between the test surface portion and the beamsplitter and thereby vary said reflected imaging beam interference intensity and define an interference intensity pattern as the distance between the test surface and the beam modifying means varies, said interference intensity pattern having a point of maximum interference contrast occurring at a position along said range of motion at which a second distance defined between said reference surface portion and said beamsplitter is equal to said first distance defined between the test surface portion and the beamsplitter;

(f) sampling, at a predetermined sampling frequency, the interference intensity pattern to define a plurality of samples of the interference intensity pattern;

(g) calculating the phase of said interference intensity pattern at a point of maximum interference contrast of the interference intensity pattern on the detector;

(h) calculating a constant $\kappa$ by curve-fitting the relationship $(1-\kappa NA^2\rho^2)$, where $\rho$ is a constant that varies from 0 to 1 and NA is an effective numerical aperture of an interferometer objective through which the extended, narrow bandwidth source is passed, to ideal data calculated using an equation defining a function $\Phi(\theta)$ which relates phase change on reflection from a surface to an angle $\theta$ of illumination incidence on the surface and which has been normalized to a zero angle of illumination incidence; and dividing said value by $1-2\kappa$ to provide the phase change on reflection introduced by said reflection of the second illumination beam from said test surface and thereby determine a topographical surface characteristic of the test surface portion.

8. A method of profiling surface characteristics of a test surface of unknown topography using a profile measuring interferometric microscope, comprising the steps of:

(a) directing a beam of extended, narrow bandwidth illumination through an objective of the microscope;

(b) refracting the illumination beam through the microscope objective and directing the refracted beam to a beamsplitter mounted in fixed relation to the objective;

(c) splitting the refracted illumination beam in the beamsplitter to form a reflected illumination beam and a transmitted illumination beam;

(d) reflecting the reflected illumination beam off a reference surface having known surface characteristics and mounted in fixed relation to the objective and to the beamsplitter to form a reflected reference surface image beam;

(e) reflecting the transmitted illumination beam off a portion of a test surface located in predetermined relation to the beamsplitter to form a reflected test surface image beam;

(f) combining the reflected reference surface image beam and the reflected test surface image beam to form a reflected imaging beam;

(g) refracting the reflected imaging beam to form a refracted imaging beam having an interference intensity, said refracted imaging beam interference intensity being a function of material characteristics of the test surface portion and of a first distance between the test surface portion and the beamsplitter;

(h) moving the microscope objective, the beamsplitter and the reference surface concomitantly over a predetermined linear range of motion so as to vary said first distance between the test surface portion and the beamsplitter and thereby vary said refracted imaging beam interference intensity and define an interference intensity pattern as the distance between the test surface and the beam modifying means varies, said interference intensity pattern having a point of maximum interference contrast occurring along said range of motion at which a second distance defined between said reference surface portion and said beamsplitter is equal to said first distance defined between the test surface portion and the beamsplitter;

(i) calculating the phase of said interference intensity pattern at said point of maximum interference contrast to provide a value proportional to a composition-dependent phase-change on reflection introduced by said reflection of the transmitted illumination beam from the test surface portion to thereby determine a topographical surface characteristic of the test surface portion;

(j) calculating a constant $\kappa$ by curve-fitting the relationship $(1-\kappa NA^2 \rho^2)$, where $\rho$ is a constant that varies from 0 to 1 and NA is an effective numerical aperture of the interferometer objective, to ideal data calculated using an equation defining a function $\Phi(\theta)$ which relates phase change on reflection from a surface to an angle $\theta$ of illumination incidence on the surface and which has been normalized to a zero angle of illumination incidence; and (k) dividing said value by $1-2\kappa$ to provide said phase change on reflection introduced by said reflection of the transmitted illumination beam from said test surface portion.

9. The method of claim 8, wherein said step (f) is performed in the beamsplitter.

10. The method of claim 8, wherein said step (b) is performed in the objective of the microscope.

11. The method of claim 8, further comprising the step of repeating each of steps (a) through (k) over multiple test surface portions so as to determine the topographical surface characteristic at a selected surface region of the test surface.

12. The method of claim 8, further comprising the steps of sampling, at a predetermined sampling frequency, the interference intensity pattern to define a plurality of samples of the interference intensity pattern, and wherein the calculation of said step (i) is carried out using the plural samples of said interference intensity pattern.

13. The method of claim 8, wherein said step (i) comprises the steps of:

(a) detecting, at a solid-state camera having a plurality of pixel sites, the interference intensity pattern;

(b) converting the interference intensity pattern into an electrical signal; and (b) digitizing, at a predetermined sampling rate, the electrical signal to form a plurality of digitized samples of the interference intensity pattern.

14. The method of claim 13, further comprising the step of storing the plural digitized samples, and wherein said step (i) is carried out on said digitized samples.

15. The method of claim 14, further comprising the steps of:

visually displaying, on a first video display, the interference intensity pattern; and visually displaying, on at least one of the first video display and a second video display, the result of the calculation made in step (i).

16. The method of claim 15, wherein said step (a) comprises the steps of:

transmitting a broad bandwidth illumination beam of spectral bandwidth $\Delta\lambda$ from an incandescent illumination source;

directing the broad bandwidth illumination beam through a narrow bandwidth filter to provide an extended, narrow bandwidth illumination beam of mean wavelength $\lambda_0$ and such that $\Delta\lambda/\lambda_0 << 1$;

directing the extended, narrow bandwidth illumination beam from the filter at an illumination beamsplitter; and directing the extended, narrow bandwidth illumination beam from the illumination beamsplitter to the microscope objective.

17. A method of profiling the surface characteristics of a test surface using a profile measuring interferometric microscope, comprising the steps of:

(a) directing a beam of extended, narrow bandwidth illumination toward an objective of the microscope;

(b) refracting the illumination beam through the microscope objective so as to direct the illumination beam toward a beamsplitter mounted in fixed relation to the microscope objective;

(c) splitting the illumination beam in the beamsplitter to form a reflected illumination beam and a transmitted illumination beam;

(d) directing the reflected illumination beam so as to cause it to impinge on and reflect from a reference surface having known surface characteristics and mounted in fixed relation to the microscope objective and the beamsplitter, said reflection from the reference surface producing a reflected reference surface image beam directed toward the beamsplitter;

(e) directing said transmitted illumination beam so as to cause it to impinge on and reflect from a portion of a test surface to be profiled, said reflection from the test surface producing a reflected test surface image beam directed toward the beamsplitter into coincidence with the reflected reference surface image beam so as to combine the reflected test surface image beam and the reflected reference surface image beam to form a reflected imaging beam;

(f) refracting the reflected imaging beam in the microscope objective to form a refracted imaging beam comprising a two-beam interference intensity formed of the combination of the reflected test surface image beam and the reflected reference surface image beam, said interference intensity being a function of material characteristics of the test surface portion and of a path length distance between the test surface portion and the beamsplitter;

(g) moving the microscope objective, the beamsplitter and the reference surface concomitantly over a predetermined linear range of motion so as to vary the path length distance between the test surface portion and the beamsplitter and thereby define an interference intensity pattern having a point of maximum fringe contrast;

(h) directing the refracted imaging beam to an optical detector for detecting the interference intensity pattern over the range of motion in said step (g);

(i) sampling, at a predetermined sampling frequency, the detected interference intensity pattern to define a plurality of samples of the interference intensity pattern;

(j) storing the plural samples;

(k) calculating the phase of the interference intensity pattern, using the stored plural samples, at a point of maximum interference contrast of the interference intensity pattern to provide a value proportional to a composition-dependent phase change on reflection introduced by said reflection of the transmitted illumination beam from the test surface portion;

(l) calculating a constant $\kappa$ by curve-fitting the relationship $(1-\kappa NA^2\rho^2)$, where $\rho$ is a constant that varies from 0 to 1 and NA is an effective numerical aperture of the microscope objective, to ideal data calculated using an equation defining a function $\Phi(\theta)$ which relates phase change on reflection from a surface to an angle $\theta$ of illumination incidence on the surface and which has been normalized to a zero angle of illumination incidence; and (m) dividing said value by $1-2\kappa$ to provide said phase change on reflection introduced by said reflection of the transmitted illumination beam from said test surface portion; and (n) repeating each of said steps (a) to (m) over multiple portions of the test surface so as to profile a selected surface region of the test surface.

18. The method of claim 17, wherein said step (a) comprises the steps of:

transmitting a broad bandwidth illumination beam of spectral bandwidth $\Delta\lambda$ from an incandescent illumination source;

directing the broad bandwidth illumination beam through a narrow bandwidth filter to provide an extended, narrow bandwidth illumination beam of mean wavelength $\lambda_0$ and such that $\Delta\lambda/\lambda_0 \ll 1$; and directing the extended, narrow bandwidth illumination beam from the filter at an illumination beamsplitter for redirecting the extended, narrow bandwidth illumination beam toward the microscope objective.

19. A profile measuring interference microscope operable for profiling surface characteristics of a test surface of unknown topography, said interference microscope comprising:

a source of an illumination beam of extended, narrow bandwidth light;

means for refracting said illumination beam;

means for directing said illumination beam toward said refracting means so that said illumination beam passes through said refracting means to form a refracted illumination beam;

beam modifying means for receiving and for dividing said refracted illumination beam into a partially reflected illumination beam and a partially transmitted illumination beam, said beam modifying means being located in predetermined relation to the test surface so that said transmitted illumination beam impinges on and is reflected from a portion of the test surface to form a reflected test surface image beam;

a reference surface having known surface characteristics and located in fixed relation to said refraction means and to said beam modifying means and so that said partially reflected illumination beam impinges on a portion of said reference surface and is reflected therefrom to form a reflected reference surface image beam;

said beam modifying means receiving said reflected reference surface image beam from the reference surface and said reflected test surface image beam from the test surface and combining said reflected test surface image beam and said reflected reference surface image beam to define a reflected imaging beam that passes through said refracting means to form a refracted imaging beam having an intensity, said refracted imaging beam intensity being a function of material characteristics of the test surface portion and of a first distance defined between the test surface portion and said beam modifying means and having a phase;

means for moving said beam modifying means, said refracting means and said reference surface concomitantly over a predetermined linear range of motion relative to the test surface so as to vary said first distance defined between the test surface portion and the beam modifying means and to thereby vary said refracted imaging beam intensity and define an interference intensity pattern as the distance between the test surface and the beam modifying means is varied, said interference intensity pattern having a point of maximum interference contrast occurring at a position along said range of motion at which a second distance defined between said reference surface portion and said beam modifying means is equal to said first distance defined between the test surface portion and said beam modifying means; and means for calculating the phase of said interference intensity pattern at said point of maximum interference contrast to provide a value proportional to a composition-dependent phase change on reflection introduced by said reflection of the transmitted illumination beam from the test surface so as to thereby determine a topographical surface characteristic of the test surface portion;

wherein said refracting means comprises a microscope objective, and wherein said calculating means comprises means
  (i) for calculating a constant $\theta$ by curve-fitting the relationship $(1-\kappa NA^2\rho^2)$, where $\rho$ is a constant that varies from 0 to 1 and NA is an effective numerical aperture of the microscope objective, to ideal data calculated using an equation defining a function $\Phi(\theta)$ which relates phase change on reflection from a surface to an angle $\theta$ of illumination incidence on the surface and which has been normalized to a zero angle of illumination incidence, and
  (ii) for dividing said value by $1-2\kappa$ to provide said composition-dependent phase change on reflection introduced by said reflection of the transmitted illumination beam from the test surface.

20. The microscope of claim 19, wherein said refracting means comprises a microscope objective.

21. The microscope of claim 20, wherein said microscope objective comprises a high numerical value interferometer objective.

22. The microscope of claim 19, wherein said beam modifying means comprises a first beamsplitter.

23. The microscope of claim 22, wherein said illumination beam directing means comprises a second beamsplitter.

24. The microscope of claim 19, wherein said moving means comprises a piezoelectric transducer.

25. The microscope of claim 19, further comprising means for sampling, at a predetermined sampling frequency, said interference intensity pattern to define a plurality of samples of said interference intensity pattern.

26. The microscope of claim 25, wherein said sampling means further comprises:
  detecting means fixedly mounted in an image plane for receiving said interference intensity pattern, said detecting means comprising a solid-state camera having plural detector pixel sites;
  means for converting the received interference intensity pattern into an electrical signal to be sampled; and
  means for converting said signal samples into digital data representative of said interference intensity pattern.

27. The microscope of claim 26, wherein said illumination beam directing means comprises a beamsplitter and said refracting means comprises a microscope objective that causes said refracted imaging beam to be transmitted through said beamsplitter to form a transmitted imaging beam which impinges on said detecting means at a detector pixel site.

28. The microscope of claim 27, wherein said determining means comprises a digital computer for processing said digital data and having a digital computer memory for storing said digital data.

29. The microscope of claim 28, further comprising a first video screen for visually displaying said interference intensity pattern received by said detecting means in said image plane, and a second video screen for visually displaying at least one of the processed digital data from said digital computer and the stored digital data in said digital computer memory.

30. The microscope of claim 19, wherein said extended, narrow bandwidth light source comprises:
  an incandescent illumination source for emitting a broad bandwidth illumination beam of spectral bandwidth $\Delta\lambda$; and
  a narrow bandwidth filter through which said broad bandwidth illumination beam from said incandescent source is directed to provide an extended, narrow bandwidth illumination beam of mean wavelength $\lambda_0$ and such that $\Delta\lambda/\lambda_0 \ll 1$.

* * * * *